W. E. MARENGO.
CUSHION TIRE.
APPLICATION FILED APR. 16, 1909.

939,524.

Patented Nov. 9, 1909.

WITNESSES:

INVENTOR:
William E. Marengo,
by
Attorneys

UNITED STATES PATENT OFFICE.

WILLIAM E. MARENGO, OF WORCESTER, MASSACHUSETTS, ASSIGNOR OF ONE-HALF TO JOHN B. PROULX, OF SOUTHBRIDGE, MASSACHUSETTS.

CUSHION-TIRE.

939,524.      Specification of Letters Patent.      Patented Nov. 9, 1909.

Application filed April 16, 1909. Serial No. 490,374.

*To all whom it may concern:*

Be it known that I, WILLIAM E. MARENGO, a citizen of the United States, residing at Worcester, in the county of Worcester and State of Massachusetts, have invented or discovered certain new and useful Improvements in Cushion-Tires, of which the following is a specification, reference being had therein to the accompanying drawings.

This invention relates to elastic cushion tires for automobiles or other vehicles, and has for its object to provide a tire which will have the requisite elasticity, but which is of such construction as to be much more durable than the cushion tires heretofore made.

To this end the invention comprises a rubber tire which is provided with what may be termed an annular two-chamber opening, the chambers being arranged to diverge from each other leaving between them, in the line of the greatest applied pressure, an annular, inwardly extending projection or ridge which is preferably supported by an annular bridge-piece which is introduced into the chamber of the tire after the body of the latter has been molded, and which, when introduced into said chamber, divides the latter into the two chambers or parts above referred to.

Figure 1:
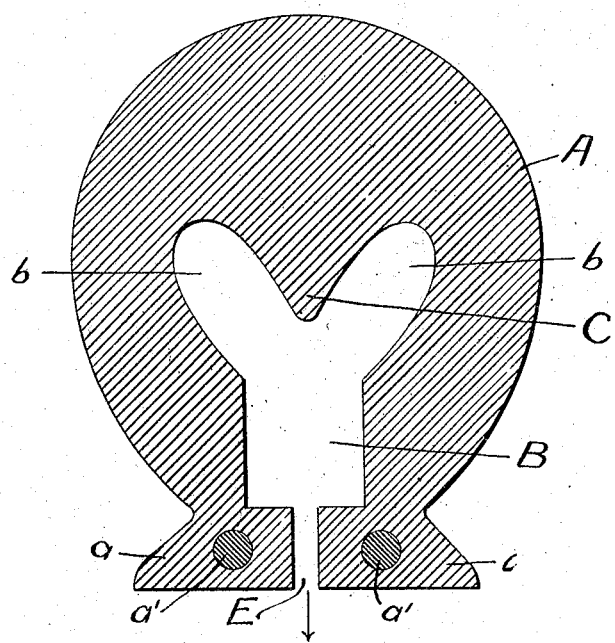
Figure 2:
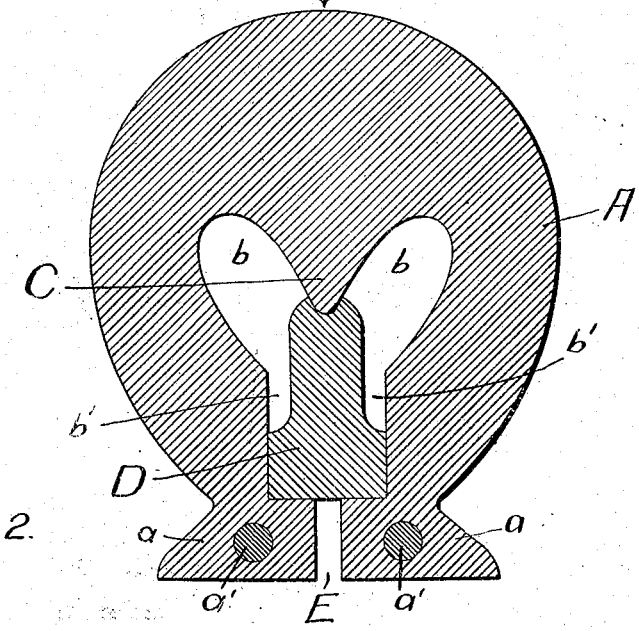

In the accompanying drawings Figure 1 is a cross section of the body portion of the improved tire, showing the form, in cross section, in which it is first molded, and Fig. 2 is a similar view with the annular bridge piece introduced into the chamber of the tire.

Referring to the drawings, A denotes the body of the tire which is provided with attaching portions *a* of any construction suitable for connection with the rim of a wheel. These attaching portions *a* may have molded into them strengthening or stiffening rings *a'* of hard rubber, as is customary. In molding the tire A it is formed with a chamber B having diverging portions *b* divided by an inwardly projecting portion or ridge C. The inner part of the chamber B, after the body of the tire has been molded, is partly filled by a supporting bridge-piece D, the inner part of said bridge-piece closely fitting the inner part of the chamber B, and said bridge-piece being provided with an annular recess or groove at its outer edge for the reception of the annular ridge-portion C. The bridge-piece D is preferably formed narrower at its outer part than at its inner part or base, so as to leave openings or chambers *b'* at its sides and which chambers *b'* form inward continuations of the diverging chambers *b*.

As it would be impossible to mold a tire with the diverging openings or chambers *b*, *b'*, excepting by first making the tire with the opening B and the slit E, it becomes necessary, after the tire has been molded, and to afford the requisite resistance to the weight or pressure on the tire, to partly fill the space B with the annular bridge-piece D which is inserted into the tire by spreading or forcing apart the split inner portion of the same, and then forcing the said annular bridge-piece into the chamber B.

It will be observed that the diverging openings *b* extend outwardly at an angle to the central portion of the tread of the tire, or to the direction of the pressure which will be brought upon the tire when the same is in use, and which direction is denoted by the arrow in Fig. 2; so that while these openings contribute to a proper resilience or elasticity of the tire and render the latter capable of the requisite vibration when in use, the tendency of the tire to flatten under the influence of the pressure is resisted by the central support afforded by the bridge-piece D in coöperation with the inwardly extending projection or ridge C. The tire cannot therefore flatten in the manner in which an ordinary cushion tire, with a central annular chamber, does, and which flattening renders the tire comparatively short-lived, in that, after comparatively little, use it is liable to break at the edges of the flattened portion. But a tire which is constructed in accordance with this invention will be practically as long-lived as a solid rubber tire, in that it will not flatten in the manner an ordinary cushion tire does, while it will have the resiliency or elasticity of a cushion tire.

Having thus described my invention I claim and desire to secure by Letters Patent:

1. An elastic cushion rubber tire having continuous annular diverging chambers extending outwardly at an angle to the line of pressure on the tire, or to the tread thereof, and divided by an annular inwardly projecting portion or ridge, said tire having at its inner part an opening communicating with the entrance to said chambers, and said tire including a solid bridge-piece of elastic material arranged in its inner portion between said chambers, but not filling the latter, and in engagement with the said inwardly projecting portion or ridge, thus serving to brace the tread portion of the tire against the applied pressure, but leaving said diverging chambers unfilled with solid material.

2. An elastic rubber cushion tire having diverging annular chambers $b$, an inwardly projecting portion or ridge C dividing said chambers, an annular chamber B, a bridge-piece D closely fitting the inner part of said chamber and contracted at the upper part of said chamber to leave annular openings or chambers $b'$ communicating with said chambers $b$, said bridge-piece having an annular groove at its outer part to receive the said inwardly projecting portion or ridge C, and the base or attaching portion of said tire being provided with a slit E.

In testimony whereof I affix my signature, in presence of two witnesses.

WILLIAM E. MARENGO.

Witnesses:
ARTHUR W. CALVER,
JOHN B. PROULX.